US012289573B1

(12) United States Patent
Chen

(10) Patent No.: US 12,289,573 B1
(45) Date of Patent: Apr. 29, 2025

(54) SPEAKER BOX

(71) Applicant: AAC Microtech (Changzhou) Co., Ltd., Changzhou (CN)

(72) Inventor: Yi Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/918,925

(22) PCT Filed: Aug. 25, 2022

(86) PCT No.: PCT/CN2022/114912
§ 371 (c)(1),
(2) Date: Oct. 14, 2022

(87) PCT Pub. No.: WO2024/007429
PCT Pub. Date: Jan. 11, 2024

(30) Foreign Application Priority Data

Jul. 4, 2022 (CN) ......................... 202221706416.1

(51) Int. Cl.
*H04R 1/02* (2006.01)
*H04R 1/28* (2006.01)

(52) U.S. Cl.
CPC ............. *H04R 1/025* (2013.01); *H04R 1/288* (2013.01); *H04R 2201/029* (2013.01)

(58) Field of Classification Search
CPC ... H04R 1/025; H04R 1/288; H04R 2201/029
USPC ............................................................ 381/87
See application file for complete search history.

(56) References Cited

U.S. PATENT DOCUMENTS

| | | | | |
|---|---|---|---|---|
| 10,993,021 B2 * | 4/2021 | Song | H04R 1/021 | |
| 11,330,363 B2 * | 5/2022 | Qin | H04R 1/2811 | |
| 11,570,544 B1 * | 1/2023 | Wang | G10K 11/162 | |
| 2019/0253779 A1 * | 8/2019 | Zhang | H04R 1/025 | |
| 2019/0349669 A1 * | 11/2019 | Niu | H04R 1/288 | |
| 2022/0174411 A1 * | 6/2022 | Song | H04R 7/04 | |
| 2023/0328428 A1 * | 10/2023 | Yang | H04R 1/2803 | 381/353 |

FOREIGN PATENT DOCUMENTS

WO WO-2021179237 A1 * 9/2021

* cited by examiner

*Primary Examiner* — Sean H Nguyen
(74) *Attorney, Agent, or Firm* — Wiersch Law Group

(57) ABSTRACT

The present invention provides a speaker box including a housing and a speaker unit accommodated in the housing. The speaker box also includes an air-permeable spacer accommodated in the housing. The housing includes a bottom wall away from the speaker unit and a side wall bent and extended from the bottom wall toward the speaker unit. The air-permeable spacer is enclosed with the bottom wall and the side wall to form a containment space filled with sound absorbing powder. The inner surface of the side wall is provided with a number of protruding portions that support the air-permeable spacer. The air-permeable spacer is fixedly connected with the protruding portion. The speaker box of the present invention saves internal space and increases the filling amount of the sound absorbing powder.

10 Claims, 3 Drawing Sheets

SPEAKER BOX

FIELD OF THE PRESENT DISCLOSURE

The present invention relates to the field of electro-acoustic transducers, in particular to a speaker box used in a portable electronic product.

DESCRIPTION OF RELATED ART

The speaker box of the related art includes a housing, a speaker unit accommodated in the housing, and an air-permeable spacer with a three-dimensional structure. The air-permeable spacer is enclosed with the housing to form a containment space filled with sound absorbing powder.

The air-permeable spacer is a three-dimensional net structure, which includes a main body and a side wall bent and extended from the main body in a direction away from the speaker unit. The housing is provided with a bottom wall away from the speaker unit. The side wall of the air-permeable spacer is fixedly connected with the bottom wall of the housing. The air-permeable spacer is fixed in the housing by the side wall. The main body, the side wall and the outer bottom wall enclose together and form a containment space filled with the sound absorbing powder.

However, when the side wall of the air-permeable spacer is fixed to the housing, it needs to be sealed with a circle of glue along the side wall, which requires comparatively larger space, and the air-permeable spacer of this structure has poor structural strength.

Therefore, it is necessary to provide a new speaker box to solve the above technical problems.

SUMMARY OF THE PRESENT INVENTION

The present invention is to overcome the above technical problems and provide a speaker box that saves internal space and can increase the filling amount of the sound absorbing powder.

For achieving the object mentioned above, the invention provides a speaker box including:

a speaker unit;

a housing accommodating the speaker unit, having a bottom wall away from the speaker unit, a side wall extending from the bottom wall toward the speaker unit;

a speaker unit accommodated in the housing;

an air-permeable spacer accommodated in the housing;

a containment space formed by the air-permeable spacer enclosed with the bottom wall and the side wall for being filled with sound absorbing powders; wherein an inner surface of the side wall has a plurality of protruding portions spaced from each other for supporting the air-permeable spacer.

Besides, an inner surface of the side wall includes four protruding portions which are symmetrically arranged.

In addition, the inner surface of the side wall includes a first inner surface located at an end along a long axis and a second inner surface located at an end along a short axis., and the protruding portion is arranged on the second inner surface.

Optionally, the protruding portion is formed by being recessed from an outer surface of the side wall of the housing toward the inner surface.

As an improvement, the protruding portion is located on a side of the air-permeable spacer away from the speaker unit.

Further, the air-permeable spacer is a plate-like structure.

Furthermore, the air-permeable spacer includes a main body and a fixed part extending from an outer perimeter of the main body in a direction away from the speaker unit; the fixed part contacts with the protruding portion.

As an improvement, the fixed part is a continuous annular structure.

As an improvement, the protruding portion and the air-permeable spacer are fixed by glue.

Optionally, the protruding portion is integrally formed with the side wall of the housing.

The air-permeable spacer provided by the present invention is a plate-like structure, and the air-permeable spacer is fixedly supported by a protruding portion fixed on the inner surface of the side wall of the housing. A plurality of protruding portions is set and are arranged with intervals. As a result, the air-permeable spacer only needs to be glued and sealed with the protruding portion, which saves space and increases the filling amount of the sound absorbing powder. And the air-permeable spacer has higher strength and more stable structure.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
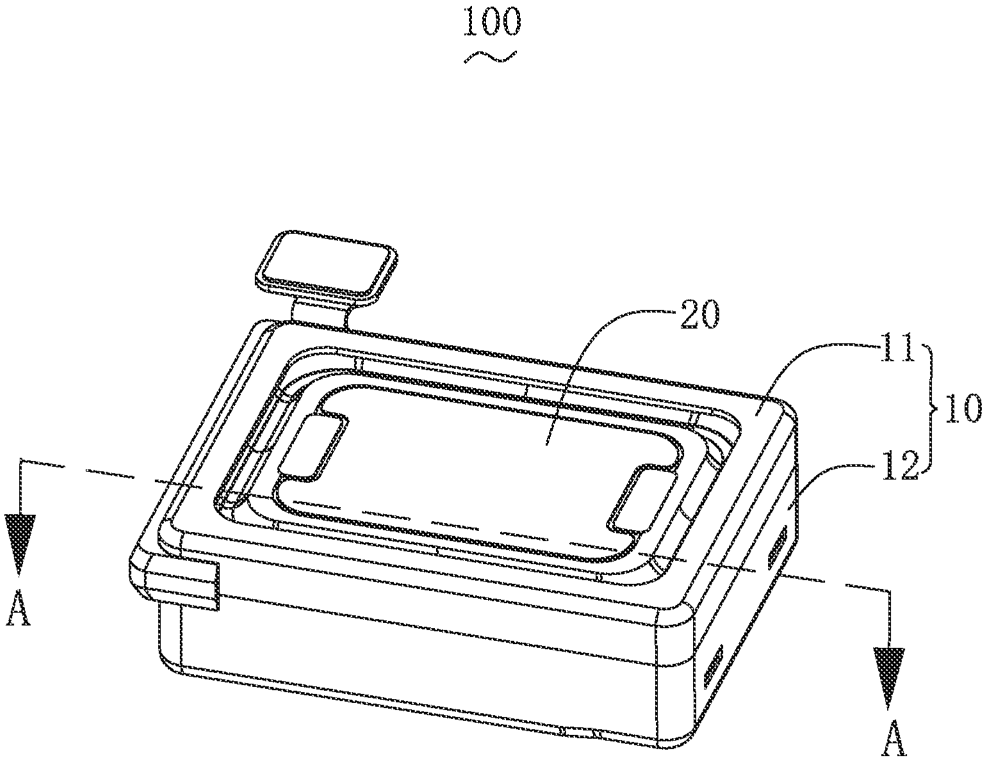
FIG. 1 is an isometric view of a speaker box of an embodiment of the present invention.
Figure 2:
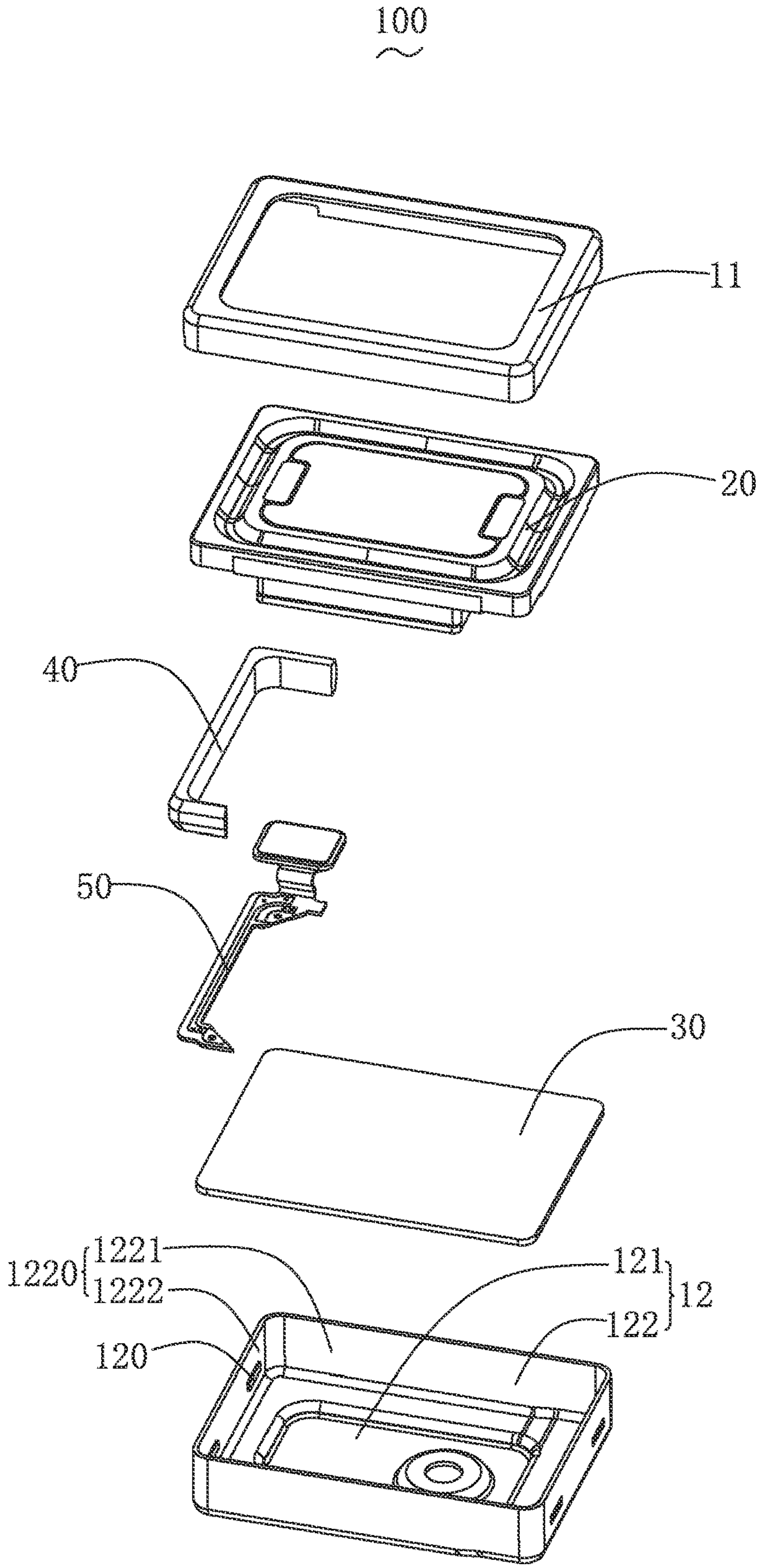
FIG. 2 is an isometric and exploded view of the speaker box.
Figure 3:
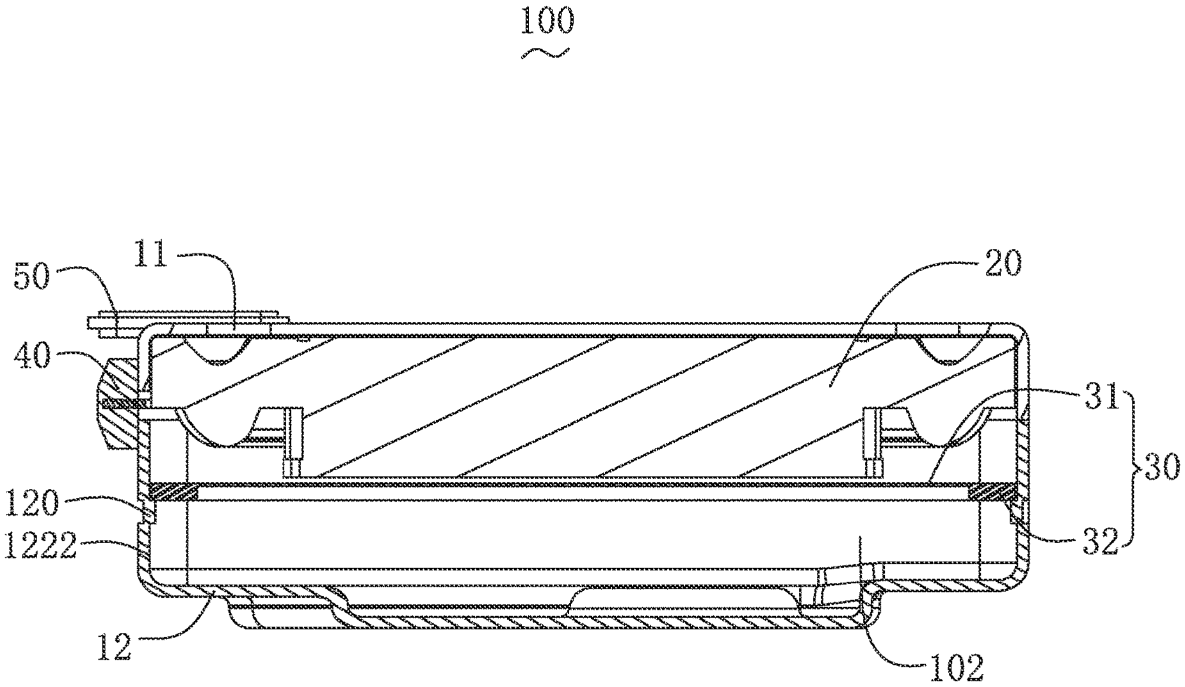
FIG. 3 is a cross-sectional view of the speaker box taken along line A-A in FIG. 1.

Referring to FIGS. 1-3, the present invention provides a speaker box 100. The speaker box 100 includes a housing 10, a speaker unit 20 and an air-permeable spacer 30 accommodated in the housing 10. The air-permeable spacer 30 and the housing 10 are enclosed to form a containment space 102 filled with the sound absorbing powder.

The housing 10 is square and includes a bottom wall 121 away from the speaker unit 20. The side wall 122 bent and extended from the bottom wall 121 toward the speaker unit 20. The air-permeable spacer 30 and the bottom wall 121 and the side wall 122 are jointly enclosed to form a containment space 102 filled with the sound absorbing powder. The inner surface 1220 of the side wall 122 is provided with a plurality of the protruding portions 120 arranged at intervals for supporting the air-permeable spacer 30. The air-permeable spacer 30 is fixedly connected with the protruding portion 120. In this embodiment, the protruding portion 120 and the air-permeable spacer are fixed by gluing, so that the air-permeable spacer 30 is fixed to the housing 10. The air-permeable spacer is fixed with a ring of glue and housing in the prior art, the air-permeable spacer 30 of the present invention only needs to be partially glued and sealed at the connection with the protruding portion 120. Space is saved and the air-permeable spacer 30 is stronger and more stable in structure.

Specifically, the inner surface 1220 of the side wall 122 includes a first inner surface 1221 located at the end of the long axis and a second inner surface 1222 located at the end of the short axis. Four protruding portions 120 are arranged. Four protruding portions 120 are respectively disposed on the two opposite second inner surfaces 1222. The second inner surface 1222 on each side is provided with two protruding portions 120. In other embodiments, the number of protruding portions may not be four, as long as it can play the role of fixing the air-permeable spacer.

In this embodiment, the protruding portion 120 is formed by being recessed from the outer surface of the side wall 122 of the housing 10 toward the inner surface. That is, the protruding portion 120 and the side wall 122 of the housing 10 are integrally formed. In other embodiments, the protruding portion can also be a separate component fixed to the inner surface of the housing. The protruding portion 120 is located on the side of the air-permeable spacer 30 away from the speaker unit 20. Specifically, the air-permeable spacer is a plate-like structure, which includes a main body 31 and a fixed part 32 extending from the outer perimeter of the main body 31 in a direction away from the speaker unit 20. The fixed part 32 is a continuous annular structure and abuts with the protruding portion 120. The setting of fixed part 32 makes it easier to assemble and fix the protruding portion 120 with the air-permeable spacer 30. In this embodiment, fixed part 32 is fixed with the protruding portion 120 by glue at the corresponding position of fixed part 32 and protruding portion 120.

In addition, the housing 10 includes an upper housing 11 and a lower housing 12 which are covered and connected to each other. The speaker unit 20 is fixed to the upper housing 11. The air-permeable spacer 30 is fixed to the lower housing 12. The upper housing 11 and the lower housing are fixedly connected through glue 40. The speaker box 100 is further provided with a circuit board 50 for supplying power to the speaker unit 20, and the circuit board 50 is fixed to the upper housing 11.

Compared with the prior art, the air-permeable spacer 30 provided by the present invention is a plate-like structure, and the air-permeable spacer 30 is fixedly supported by the protruding portion 120 fixed on the inner surface 1220 of the side wall 122 of the housing 10. A plurality of the protruding portion 120 are arranged and spaced apart. As a result, the air-permeable spacer 30 only needs to be glued and sealed with the protruding portion 120, which saves space, improves the filling amount of sound absorbing powder, and the air-permeable spacer 30 has higher strength and more stable structure.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box including:

a speaker unit;

a housing accommodating the speaker unit, having a bottom wall away from the speaker unit, a side wall extending from the bottom wall toward the speaker unit;

a speaker unit accommodated in the housing;

an air-permeable spacer accommodated in the housing;

a containment space formed by the air-permeable spacer enclosed with the bottom wall and the side wall for being filled with sound absorbing powders; wherein an inner surface of the side wall has a plurality of protruding portions spaced from each other for supporting the air-permeable spacer.

2. The speaker box as described in claim 1, wherein an inner surface of the side wall includes four protruding portions which are symmetrically arranged.

3. The speaker box as described in claim 2, wherein the inner surface of the side wall includes a first inner surface located at an end along a long axis and a second inner surface located at an end along a short axis, and the protruding portion is arranged on the second inner surface.

4. The speaker box as described in claim 1, wherein the protruding portion is formed by being recessed from an outer surface of the side wall of the housing toward the inner surface.

5. The speaker box as described in claim 1, wherein the protruding portion is located on a side of the air-permeable spacer away from the speaker unit.

6. The speaker box as described in claim 1, wherein the air-permeable spacer is a plate-like structure.

7. The speaker box as described in claim 6, wherein the air-permeable spacer includes a main body and a fixed part extending from an outer perimeter of the main body in a direction away from the speaker unit; the fixed part contacts with the protruding portion.

8. The speaker box as described in claim 7, wherein, the fixed part is a continuous annular structure.

9. The speaker box as described in claim 1, wherein the protruding portion and the air-permeable spacer are fixed by glue.

10. The speaker box as described in claim 1, wherein the protruding portion is integrally formed with the side wall of the housing.

* * * * *